United States Patent [19]
Horn

[11] Patent Number: 5,249,722
[45] Date of Patent: Oct. 5, 1993

[54] EASY ACCESS BOW HOLDER

[76] Inventor: Dennis L. Horn, 3422 Valley Rd., Marysville, Pa. 17053

[21] Appl. No.: 866,203

[22] Filed: Apr. 9, 1992

[51] Int. Cl.⁵ ............................................. B60R 9/00
[52] U.S. Cl. .............................. 224/42.45 R; 224/913; 224/916; 248/290; 211/64
[58] Field of Search ............... 224/42.06, 42.12, 42.13, 224/42.15, 42.21, 42.24, 42.25, 42.31, 42.38, 42.45 R, 282, 913, 916, 917, 42.42, 42.44, 42.08, 42.28, 42.33–42.36, 42.18, 42.28; 248/290, 294, 305, 316.7, 289.1, 278, 281.1, 282; 182/127; 211/60.1, 64, 70.5, 70.8, 96, 23, 89, 124; 49/371, 388, 449, 453

[56] References Cited

U.S. PATENT DOCUMENTS

| | | | |
|---|---|---|---|
| 236,715 | 1/1881 | Neeley | 49/371 |
| 2,781,897 | 2/1957 | Dale | 206/16 |
| 2,803,349 | 8/1957 | Talbot | 224/42.03 B |
| 3,252,637 | 5/1966 | Hart | 224/1 |
| 4,108,313 | 8/1978 | Bogar, Jr. | 211/64 |
| 4,212,417 | 7/1980 | Scott | 224/42.21 |
| 4,282,994 | 8/1981 | Hilliard | 224/42.15 |
| 4,434,919 | 3/1984 | Flowers | 224/42.24 |
| 4,564,167 | 1/1986 | Smith | 224/42.45 R |
| 4,705,448 | 11/1987 | Mungons | 224/42.08 |
| 4,869,409 | 9/1989 | Wright | 224/42.21 |
| 4,957,229 | 9/1990 | Freeman | 224/42.45 R |
| 4,976,386 | 12/1990 | Geiger | 224/42.45 R |
| 5,020,707 | 6/1991 | Nozel et al. | 224/42.21 |
| 5,118,020 | 6/1992 | Firetti | 224/42.03 B |

Primary Examiner—Henry J. Recla
Assistant Examiner—Robert A. Goldman
Attorney, Agent, or Firm—Richard C. Litman

[57] ABSTRACT

A transport bracket assembly for weaponry including a first bracket affixed to, for example, a vertical panel adjacent the bed of a conventional pickup truck, and a swinging bracket connected to the fixed bracket in swinging gate fashion by a pair of pintles. The swinging bracket has two pairs of distinct holders for receiving a firearm, e.g., a rifle, or a bow. The holders may be adjusted along the second bracket to different positions. A clip assembly above and attached to the swinging bracket engages the stabilizer of a conventional bow. An interengaging, cooperating latch and guide assembly includes a spring loaded lockbolt on the fixed bracket inserted into a latch element lock bore on the swinging bracket for retaining the swinging bracket in a closed position against the fixed bracket. A guide on the fixed bracket assures proper alignment of the lock bore with the lockbolt. A keeper on one of the pintles assures that the swinging bracket remains on the fixed bracket; however, the keeper is easily removed to permit disassembly of the swinging bracket from the fixed bracket.

14 Claims, 2 Drawing Sheets

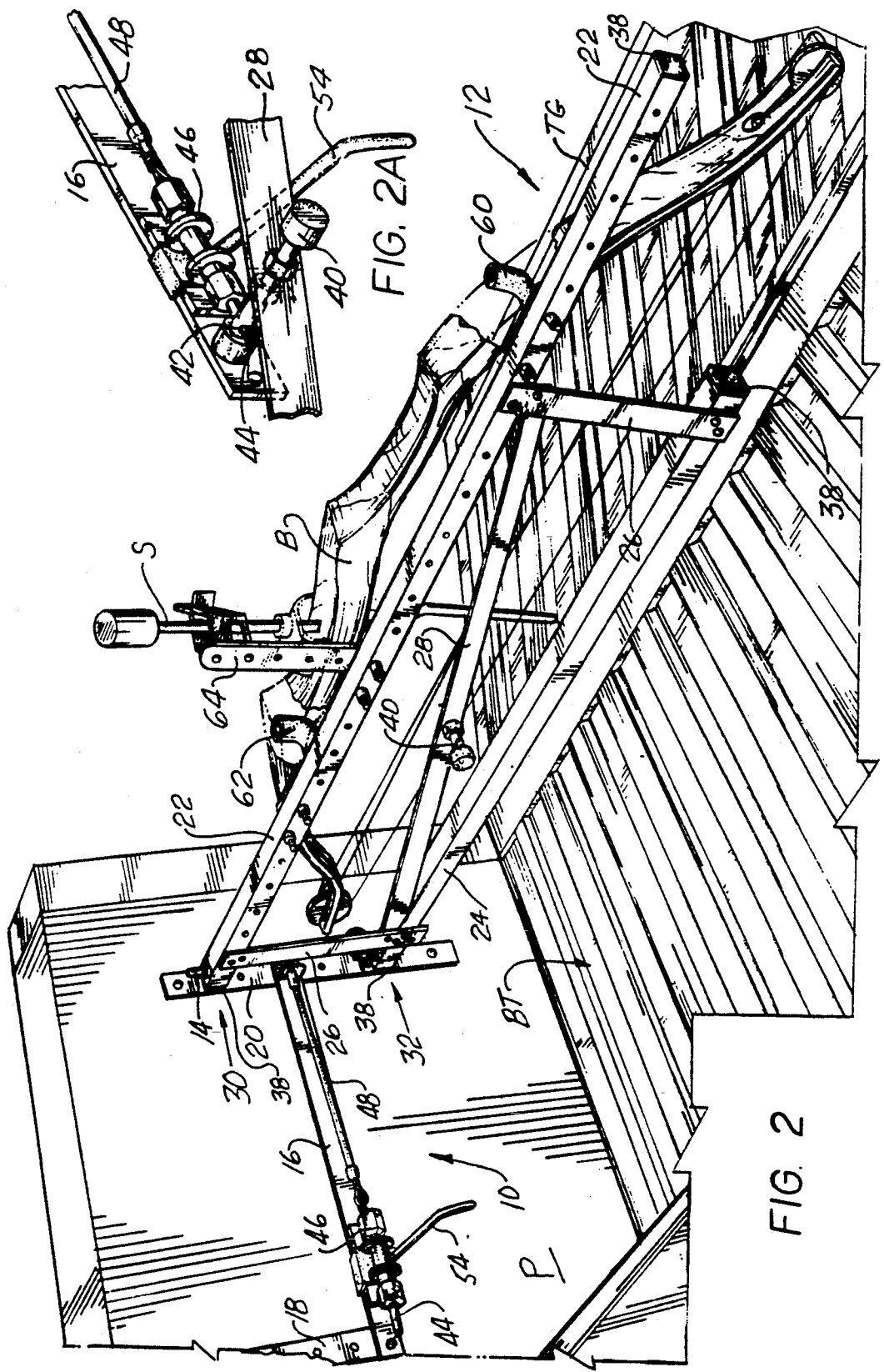

EASY ACCESS BOW HOLDER

BACKGROUND OF THE INVENTION

1. Field of the Invention

The present invention relates to the field of weaponry racks, and more specifically, to an improved rifle or bow holder bracket assembly, mounted on a sidewall on the inside of the bed of a pickup truck.

2. Description of the Prior Art

Bow holders or firearms holder racks or bracket assemblies for transporting bows or firearms on vehicles are common. Prior art holders have shortcomings that include: (1) nonstable holding of the bows resulting in the potential for misalignment of the sights during transport, (2) inability to transport a bow with arrows and stabilizers directly on the bow, (3) noninterchangeablility in transporting from bows to firearms or vice versa, and (4) cumbersome accessibility to the bows or firearms.

U.S. Pat. No. 2,781,897 issued on Feb. 19, 1957 to Vernon F. Dale discloses an impact resistant, gun carrying case to transport firearms in automobiles without the ingress of dust or dirt.

U.S. Pat. No. 3,252,637 issued on May 24, 1966 to Raymond V. Hart discloses a gun rack for motor vehicles held across the front lower panel of a seat.

U.S. Pat. No. 4,108,313 issued on Aug. 22, 1978 to Earl M. Bogar, Jr. discloses a vehicle mounted gun rack that has extendable members accommodating various vertical spacings between brackets for containing guns of varying widths.

U.S. Pat. No. 4,957,229 issued on Sep. 18, 1990 to Lowell J. D. Freeman discloses a vehicle mounted archery bow holder for securing the bow by arm members at its arc and its strings, thereby preventing the possibility of misalignment of the sights during transport.

None of the above inventions and patents, taken either singly or in combination, is seen to describe the instant invention as claimed.

SUMMARY OF THE INVENTION

The present invention is an improved weaponry holder bracket assembly with a swinging bracket unit that selectively holds a bow or firearm, e.g., a rifle, and which is connected to a bracket support mounted on the inside panel of a pickup truck. Hinges allow the bow holder to swing out to the tailgate area of the pickup truck from the inner left or right vertical panels in the bed of a pickup truck to expedite easy and virtually silent bow or firearm access during hunting.

Accordingly, it is a principal object of the invention to provide an improved weaponry holder for transporting a bow or firearm in a pickup truck or similar vehicle and allowing for quick, easy accessibility to the weapon at the hunting site.

It is another object of the invention to provide an improved bow holder for transporting a bow in a stable fashion so that the sights will not become misaligned.

It is a further object of the invention to provide an improved bow holder for transporting a bow having a full supply of arrows and a stabilizer intact upon the bow, thus eliminating the need to disassemble them from the bow.

Still another object of the invention is to provide a weapons holder for transporting a firearm for quick, easy accessibility at the hunting site.

An additional object of the invention is to provide a weapons holder for transporting a bow with arrows and/or a firearm, which may be mounted on pickup trucks of varying dimensions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a perspective view similar to FIG. 1, but illustrating the weaponry holder supporting a bow, and showing the holder in an open, deployed position with the swinging bracket supporting a bow located at the tailgate area of the pickup truck.

FIG. 2A is a detail, partial perspective view of an interengaging, cooperating latch for securing the swinging bracket in the closed position, against the fixed bracket.

Similar reference characters denote corresponding features consistently throughout the attached drawings.

DETAILED DESCRIPTION OF THE PREFERRED EMBODIMENT

Figure 1:
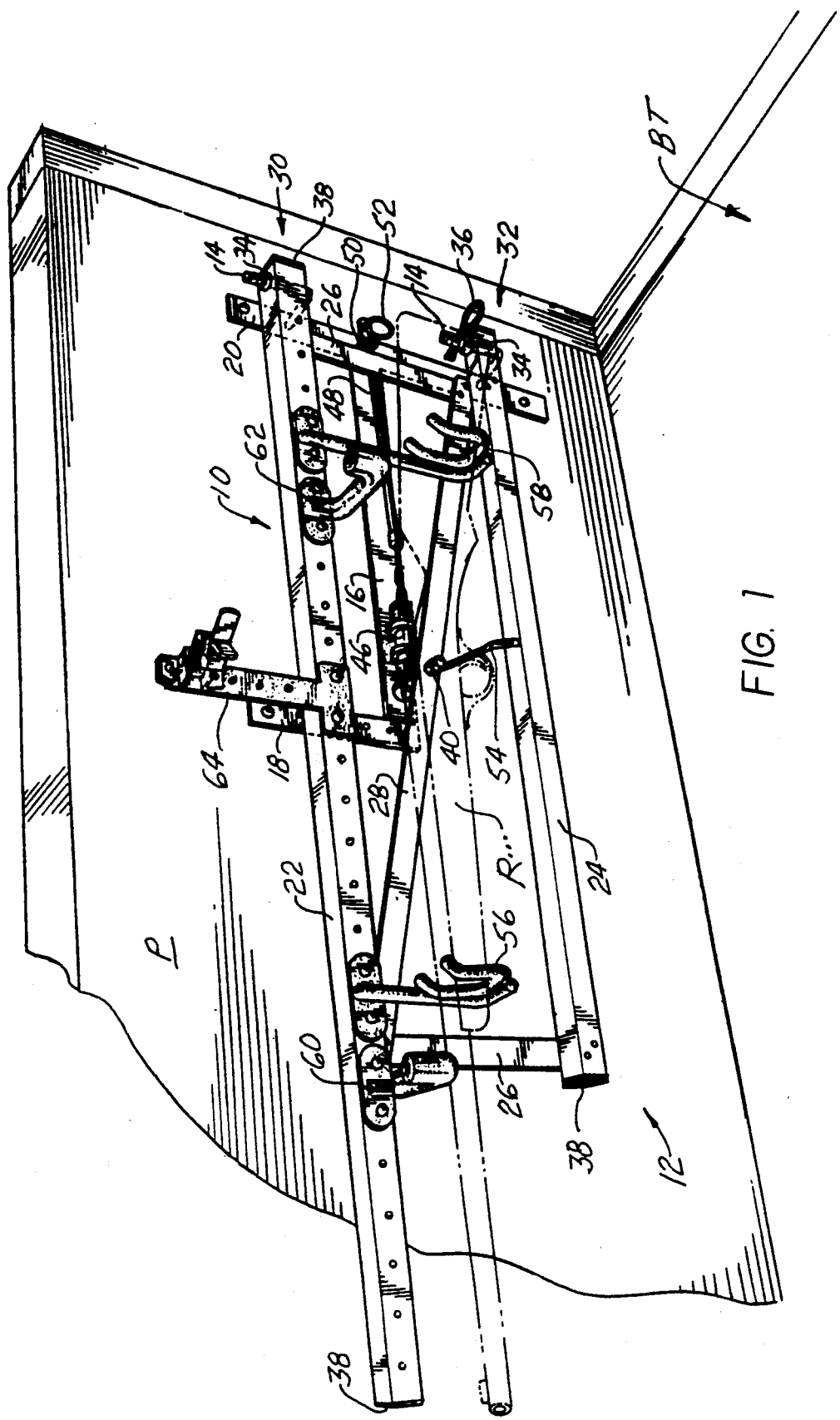
FIG. 1 is a perspective view of the weaponry holder of this invention, mounted on the interior of a bed panel of a pickup truck and supporting a rifle, the weaponry holder being in a transport position with a swinging bracket closed against a fixed bracket.

With reference to the drawings, the transport bracket assembly of this invention is made up of two major subassemblies, these being a first, fixed bracket 10 and a second, swingable bracket 12. The swinging bracket 12 is pivotally connected to the fixed bracket 10 in swinging gate fashion by a pair of pintles 14, 14, through one end of bracket 12.

Fixed bracket 10 is made from bar stock material and includes a main frame member 16, a vertical end piece 18, and a gate post 20, the pintles 14 being mounted thereto. A series of additional bores may be formed through both piece 18 and post 20, to provide additional locations for bolting fixed bracket 10 to the interior side panel P of a pickup truck, adjacent the bed of the truck BT. The additional bores allow the selective use of two or more bolts in each member 18, 20, thus imparting a universal mounting advantage to the invention.

The swinging bracket 12 is made of two lengths of suitable box beam stock as shown, there being an upper weaponry support beam 22 and a lower frame piece 24. The quadrilateral configuration of swinging bracket 12 is completed by a pair of end members 26, 26, and a cross brace 28 to impart strength to the overall bracket 12.

Ends 30, 32 of beam 22 and frame piece 24, respectively, constitute fixed hinges and are through-bored as shown to receive pintles 14, 14. A pair of nylon or other plastic material bushings or sleeves 34 are provided in fixed hinges 30, 32, surrounding the vertical stems of pintles 14, 14. If desired, a keeper 36, in the form of an otherwise conventional hitch pin or cotter pin, may be provided on and through the lower pintle 14, above hinge 32, to assure retention of bracket 12 in assembly with fixed bracket 10. Of course, the keeper 36 could be mounted on and through the upper pintle 14, above hinge 30, as an alternative. In either case, with mere removal of keeper 36, the gate or swinging bracket 12 may be disassembled from fixed bracket 10 for storage when its use is not needed and extra room is needed in the pickup bed BT of the pickup truck in which the invention is installed.

For the sake of aesthetics as well as safety to the user, the open ends of both the support beam 22 and lower frame piece 24 are plugged by snap fit end caps 38 as shown. With particular reference to the right hand portion of FIG. 1 and the center portion of FIG. 2, it can be appreciated that the length dimension of each fixed hinge 30, 32 with its cap 38, beyond its pintle 14 is predetermined so that when gate bracket 12 is opened to the position shown in FIG. 2, the bracket 12 is at about a right angle to fixed bracket 10, and positioned adjacent the tailgate TG of the pickup truck, for easy access to the weapon carried on the bracket 12.

Turning now to FIGS. 2 and 2A in particular, the interengaging, cooperating latch mechanism of the invention will be discussed. A projecting latch element 40 is generally centrally located on cross brace 28 and is of a length so that, when gate bracket 12 is in a closed position against fixed bracket 10, the two brackets 10, 12 are aligned just about parallel one another as seen in FIG. 1. A lock bore 42 is defined through latch element 40, which cooperates with a sliding lockbolt 44 received therein. In turn, lockbolt 44 is slidably mounted in lockbolt mount 46, affixed to fixed bracket main frame 16. Lockbolt 44 is spring urged to a latching position, or to the left in the sense of the drawing figures, by an otherwise conventional, spring loaded cable release 48, mounted at 50, and operated by a finger ring 52. The operative end of the cable release is, of course, attached to an end of lockbolt extended through the rear of the lockbolt mount 46. A simple pulling action on finger ring 52 causes the lockbolt 44 to disengage from lock bore 42 so that the gate bracket 12 may be swung from the closed position shown in FIG. 1 to an open position shown in FIG. 2. When the gate 12 is to be closed, a latch guide 54, extended downwardly and outwardly from the center of lockbolt mount 46, assures that the lock bore will be properly and precisely located for reinsertion of the lockbolt 44 into and through lock bore 42. Latch guide cooperates with a bottom edge of cross brace 28 during the closing and latching of gate bracket 12 against fixed bracket 10.

As best illustrated in FIG. 1, a pair of upwardly open, U shaped holders 56 and 58 are mounted on weaponry support beam 22 by a pair of conventional nut and bolt assemblies. Holders 56, 58 are used to support a weapon such as a rifle R, as shown. Furthermore, weaponry support beam 22 includes a plurality of equispaced, through bores for mounting of the holders 56, 58 in selected one of a number of positions, so that the holders 56, 58 are properly located and spaced to receive and hold a rifle R, for example, by the stock and barrel of the rifle as shown.

The invention is used to mount a rifle, as shown in FIG. 1, or a bow B, as shown in FIG. 2. To this end, a pair of cradles 60, 62 are mounted on weaponry support beam 22, again by pairs of conventional nut and bolt assemblies, and are selectively positioned by employing the appropriate pairs of the through bores in beam 22, in the same manner as the holders 56, 58 are secured. Of particular importance is the fact that both holders and cradles may be mounted on beam 22 and then selectively used to mount either a firearm such as a rifle or a bow, without any adjustment or removal of parts, unlike prior art weaponry transport brackets. This feature makes use of the invention as simple and uncomplicated as possible.

For further secure mounting of a bow B, equipped with a conventional stabilizer S, a spring loaded clip assembly 64 may be centrally mounted on beam 22, for engaging stabilizer S as shown. The clip assembly 64 is also selectively, adjustably mounted by a pair of conventional nut and bolt assemblies through an appropriate pair of the through bores in weaponry support beam 22. Also, the clip portion of assembly 64 may be selectively, vertically located by simply changing the mounting thereof on the vertical stem of clip assembly 64 and bolting the clip to a different location by use of another bore and a conventional nut and bolt assembly. This even further enhances the universal flexibility of weaponry mounting provided by this invention.

Another important advantage provided by this invention will be readily appreciated from sportsmen and others skilled in the art. An inspection of FIG. 2 reveals that the entire outer side of the conventional bow B is unencumbered by any straps, braces or other attachments so common in prior art bow holders. Thus, a quiver and a full complement of arrows (not shown) can remain in place on the outboard side of the bow B when it is mounted on the invention and does not have to be removed when the invention is used. Referring again to FIG. 1, it is also readily appreciated that a rifle R equipped with a sight (not shown) can be mounted in the holders 56, 58 for transport, without any need of removal of the sight.

It is to be understood that the present invention is not limited to the sole embodiment described above, but encompasses any and all embodiments within the scope of the following claims.

I claim:

1. A swingable mounting rack assembly for attachment to a vertical panel of a vehicle, and configured for holding a firearm and an archery bow, comprising:
   a. first, fixed bracket means secured to a vehicle's vertical panel;
   b. second, swingable bracket means having plural pairs of separate and distinct holder means for holding a firearm and an archery bow, said second, swingable bracket means further including means for selectively mounting each of said pairs of holder means on said swingable bracket means, in one of a plurality of positions therealong;
   c. hinge means for mounting said second bracket means onto said first, fixed bracket means in swinging gate fashion, said second bracket means being rotatable through a generally horizontal arc of about ninety degrees, from a closed position generally against and parallel with said first, fixed bracket means, to an open position at approximately a right angle with respect to said first, fixed bracket means;
   d. interengaging, cooperating latch means mounted on said first and second bracket means for locking said second, swingable bracket in said closed position;
   e. said plural pairs of separate and distinct holder means being mounted on said second bracket means for readily, removably attaching an archery bow to one of said pairs of holder means, and for readily, removably attaching a firearm to another of said pairs of holder means, said second swingable bracket means further including stabilizer spring loaded clip assembly means expandable in a horizontal direction from a normally closed position for engaging a stabilizer of a conventional bow so as to hold the stabilizer in a vertical position when a bow is placed in said holder means, thus to further assure secure holding of a bow on said second, swingable bracket means.

2. The invention as claimed in claim 1, said first, fixed bracket means including a generally vertically disposed mounting plate, said hinge means comprising a pair of fixed hinges and a cooperating pair of mating pintles upon which said fixed hinges are rotatably mounted.

3. The invention as claimed in claim 2, wherein said pair of separate and distinct holder means mounted on said second bracket means comprise a first pair of generally U-shaped, upwardly open holders for receiving the stock and barrel of a conventional rifle, and a second pair of cradles for receiving the arms of a conventional bow.

4. The invention as claimed in claim 2, said pintles being mounted on said mounting plate and said hinges being part of said second, swingable bracket means.

5. The invention as claimed in claim 4, said hinge means further comprising keeper means for retaining said hinge means in assembly.

6. The invention as claimed in claim 2, said hinge means further comprising keeper means for retaining said hinge means in assembly.

7. The invention as claimed in claim 1, wherein said interengaging, cooperating latch means comprise a projecting latch element, extended inwardly from said second bracket means toward said first bracket means, means defining a lock bore through said latch element, and a lockbolt slidably mounted on said first, fixed bracket means, movable to a position in and through said latch element lock bore, thus to secure said second, swingable bracket means in said closed position.

8. The invention as claimed in claim 7, wherein said pair of separate and distinct holder means mounted on said second bracket means comprise a first pair of generally U-shaped, upwardly open holders for receiving the stock and barrel of a conventional rifle, and a second pair of cradles for receiving the arms of a conventional bow.

9. The invention as claimed in claim 7, there further being spring means mounted on said fixed bracket means for urging said lockbolt into said position in and through said latch element lock bore.

10. The invention as claimed in claim 9, further comprising a latch guide means, mounted on said first, fixed bracket means, adjacent said slidably mounted lockbolt, for final guiding of said second bracket as it moves toward said closed position, to assure said lockbolt is positioned to enter into said latch element latch bore when said second, swingable bracket is in said closed position.

11. The invention as claimed in claim 10, wherein said pair of separate and distinct holder means mounted on said second bracket means comprise a first pair of generally U-shaped, upwardly open holders for receiving the stock and barrel of a conventional rifle, and a second pair of cradles for receiving the arms of a conventional bow.

12. The invention as claimed in claim 7, further comprising a latch guide means, mounted on said first, fixed bracket means, adjacent said slidably mounted lockbolt, for final guiding of said second bracket as it moves toward said closed position, to assure said lockbolt is positioned to enter into said latch element latch bore when said second, swingable bracket is in said closed position.

13. The invention as claimed in claim 1, wherein said plural pairs of separate and distinct holder means mounted on said second bracket means comprise a pair of generally U-shaped, upwardly open holders for receiving a stock and a barrel of a conventional rifle, and a pair of cradles for receiving a conventional bow.

14. A swingable mounting rack assembly for attachment to a vertical panel of a truck, and configured for holding a firearm and an archery bow, comprising:

first, fixed bracket means secured to a truck vertical panel;

second, swingable bracket means for holding a firearm and archery bow;

hinge means for mounting said second bracket means onto said first, fixed bracket means in swinging gate fashion, said second bracket means being rotatable through a generally horizontal arc of about ninety degrees, from a closed position generally against and parallel with said first, fixed bracket means, to an open position at approximately a right angle with respect to said first, fixed bracket means;

interengaging, cooperating latch means mounted on said first and second bracket means for locking said second, swingable bracket in said closed position; and holder means mounted on said second bracket means for readily, removably attaching an archery bow thereto and including a stabilizer spring loaded clip assembly means expandable in a horizontal position for engaging a stabilizer of a conventional bow held thereby in a vertical direction while positioned in said holder means, thus to further assure secure holding of a bow on said second, swingable bracket means.

* * * * *